INVENTORS
DONALD C. SMITH
JOHN C. KING
BY
Meelin and Hanscom
ATTORNEYS

INVENTORS
DONALD C. SMITH
JOHN C. KING 3,016,146
PORTABLE WATER TREATMENT DEVICE
Donald C. Smith, Downey, and John C. King, Los Angeles, Calif., assignors to Alloy Die Casting Co., Los Angeles, Calif., a corporation of California
Filed May 15, 1958, Ser. No. 735,414
2 Claims. (Cl. 210—190)

This invention relates to water treatment devices and more particularly to a unitary, self-contained, portable water treatment device adapted to soften or condition water.

It is an object of this invention to provide a small portable water treatment device capable of varied water treatment operations and designed for use in the home, or in restaurants or the like where the operators of the equipment are most likely unskilled in the intricacies of water treatment.

Another object of the invention is to provide a water treatment device which is completely self-contained in a unitary structure and which is inexpensively constructed.

A more specific object of the invention is to provide a portable water treatment apparatus comprising a vertically elongated enclosed tank, an enclosed housing formed on and with the outer wall of said tank and extending from the bottom to the top of said tank, said housing having an end wall opposed to said tank wall, a partition formed between said housing end wall and said tank wall, said partition extending downwardly from the top of said housing and then to a side wall thereof to divide said housing into first and second separate compartments, means forming a first passage laterally through said tank wall into the lower end of said first compartment, means forming a second passage laterally through said tank wall into the upper end of said second compartment, an inlet conduit extending from the exterior of said first compartment into the lower end thereof, a discharge conduit extending from the upper end of the second compartment to the exterior thereof, means forming a third passage through the top of said housing into said first compartment, and a plug member removably secured in said third passage.

Other objects and advantages will become apparent in the course of the following detailsd description.

In the drawings, forming a part of this application and in which like parts are designated by like reference numerals throughout the same, FIG. 1 is a vertical sectional view through the apparatus constructed in accordance with the invention, and showing the use thereof as a water softener.

Figure 1:
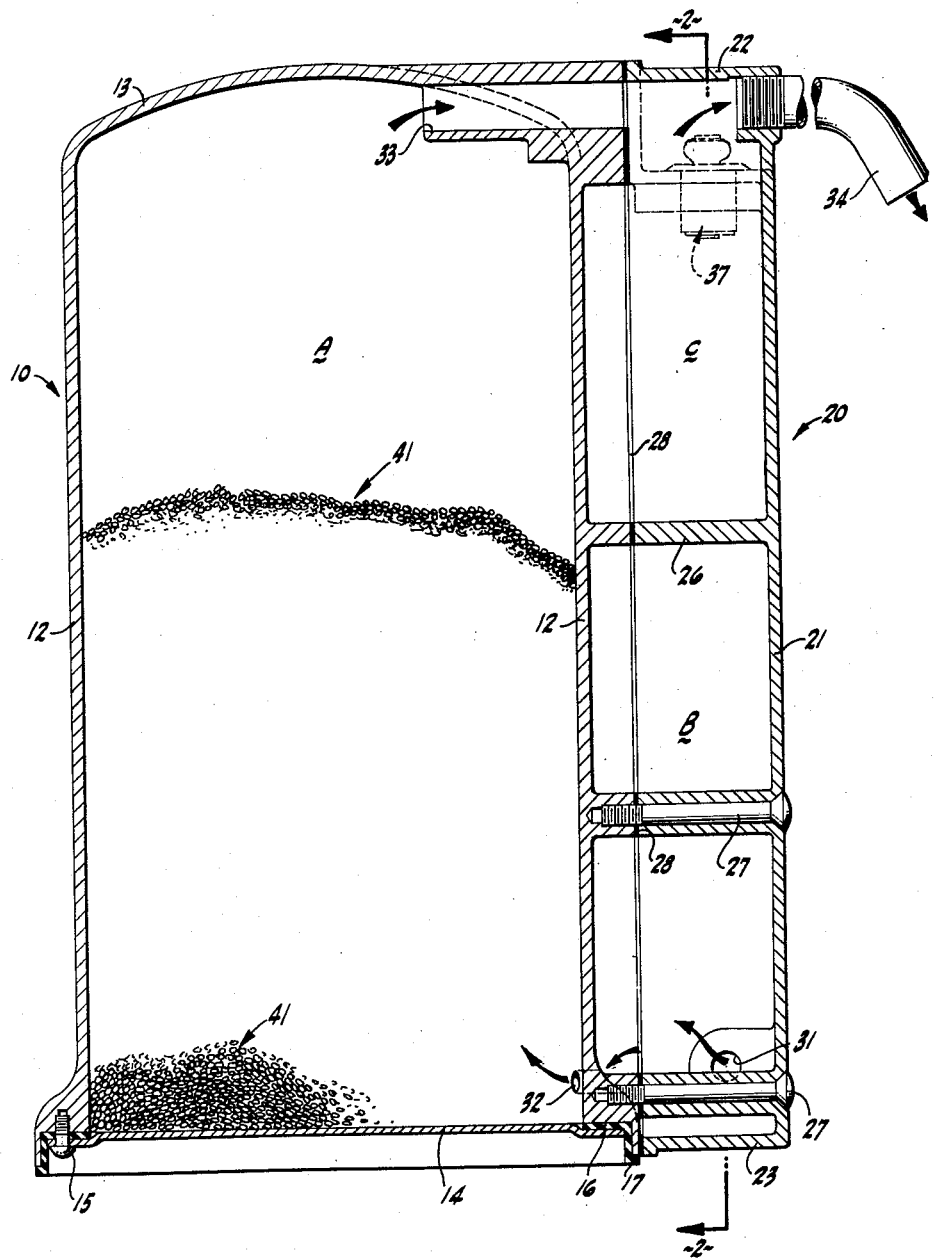
Figures 2, 3:
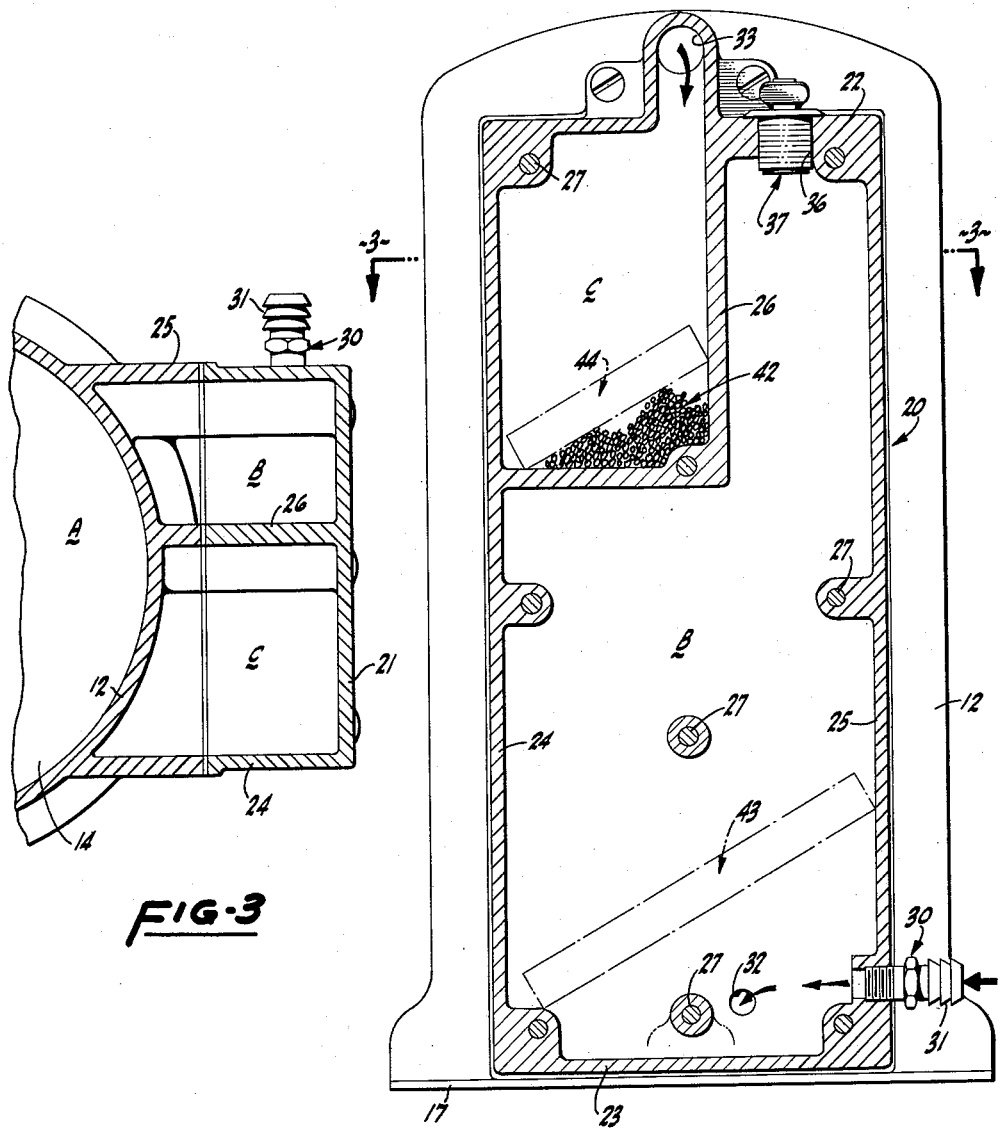
FIG. 2 is a sectional view, taken on line 2—2 of FIG. 1, with parts shown in elevation and showing the use of the device as a water conditioner.
FIG. 3 is a sectional view, taken on line 3—3 of FIG. 2, with parts shown in plan.

Referring now to the drawings, the water treating device, generally indicated by the reference numeral 10, comprises a vertically elongated tank A having a cylindrical side wall 12 and a top wall 13 integral therewith. The tank A is provided with a removable bottom wall 14, normally held to the tank by bolts 15 or the like. A resilient gasket member 16 formed of rubber or the like seals between the bottom wall and the side wall of the tank, and has a downwardly and outwardly extending portion 17 which extends beneath and around the bottom of the tank wall 12 to provide a protective seating surface for the device so that the metal side walls of the tank will not scar or scratch a supporting surface on which the device is placed.

An enclosed housing 20 is formed on and with the outer surface of the tank side wall 12, the housing having an end wall 21 opposed to the tank wall 12, a top wall 22, a bottom wall 23 and side walls 24 and 25. A partition member 26, formed between the housing end wall 21 and the tank wall 12 extends downwardly from the housing top wall 22 and then to housing side wall 24 to divide the housing into two separate compartments B and C.

The enclosed housing 20 is divided along a vertical plane through the walls 22, 23, 24 and 25 and the partition 26 in order that the housing end wall 21 may be removable from the tank to obtain full access into the compartments B and C. Bolts 27 are provided to normally hold the outer part of the housing in tight engagement with the tank, and a suitable gasket 28 is provided to seal the contacting surfaces.

An inlet conduit 30 threaded through housing side wall 25 is provided with a hose connection 31. A passage 32 is formed through the tank wall 12 to provide fluid communication from compartment B into the lower end of tank A. Another passage 33 through the tank wall 12 provides fluid communication from the top of tank A into the top of compartment C, and a discharge conduit 34 extends outwardly from the top end of compartment C.

An inlet passage 36 is formed through the top wall 22 of the housing into compartment B, and is provided with a plug member 37 removably secured therein.

Preferably, the tank and the removable housing part are formed by casting.

In the use of the device as a water softener, the tank A is charged through the removable bottom 14 with a desired quantity of a softening agent, such as zeolite 41. A hose is run from a conventional source, as for example a kitchen spigot, and connected to the inlet conduit 30. Water will flow through the inlet conduit 30 into compartment B, and then through passage 32 into tank A. The incoming water percolates upwardly through the zeolite which removes the scale forming calcium and magnesium salts therefrom. The water then passes through passage 33 into compartment C and finally discharges for use through the discharge conduit 34. The hardness of the water is controlled by the use of synthetic zeolite.

After a period of use, the zeolite will exhaust its capacity for removing hardness from the water, and must be recharged. This is accomplished by removing the plug 37 and pouring a predetermined quantity of salt or salt brine through passage 36 into compartment B. Then, water is again circulated through the device to bring the brine into contact with the zeolite to recondition it for further hardness removing. After recharging, the device is flushed out with fresh water and may again be used for normal water softening operations.

At times it may be desirable to use the device as a water conditioner to keep the scale forming minerals in suspension in the water in order to prevent scale from depositing out of the water. In this case, no zeolite is placed in tank A, since this would remove calcium and magnesium from the water, but rather a quantity of solid sodium silicate 42 is placed in compartment C to remove dissolved oxygen from the water and also to increase the pH value of the water. A bar of zinc 43 is placed in compartment B, and a bar of copper is placed in compartment C. These bars of dissimilar metal act together to provide an electrolytic action which serves to keep the scale forming minerals in suspension. It will be noted that since the discharge spout 34 is at the upper end of compartment C, this compartment will always be filled with water during the use of the device.

The foregoing descriptions of the water treating operations are not intended to be detailed descriptions of the same but are included to illustrate the versatility of the described apparatus. As may be seen, we have provided an extremely simple, unitary structure which is easily adaptable for different water treatment operations and which is highly portable. The simplicity of the device makes it very convenient for use by housewives, waitresses and others who are usually unversed in the field of water treatment and ensures desired results with a minimum of explanation or instruction.

It is to be realized that the form of the invention herewith shown and described is to be taken as a preferred embodiment of the same, and that various changes in the shape, size and arrangement of parts may be resorted to without departing from the spirit of the invention or the scope of the attached claims.

Having thus described our invention, what we claim and desire to secure by Letters Patent is:

1. A container for water conditioning or treating purposes comprising a vertically elongated enclosed tank having a bottom and side wall members; an enclosing structure formed on and with a side wall of said tank, said side wall provided with a laterally outward projecting and continuous sealing edge, said structure having an end wall member having a complementary laterally projecting and continuous sealing edge adapted to be juxtaposed with said side wall edge, means for fastening said end wall member to said side wall, thereby forming an enclosure; a partition extending between said end wall member and said side wall formed by complementary laterally projecting edges on each, said edges extending downwardly from said sealing edges at the top of said structure and then to said sealing edges at the side of said structure, said partition dividing said enclosure into first and second treating compartments, a first passage opening formed laterally through said tank side wall adjacent said bottom and fluidly communicating with the lower end of said first compartment, a second passage opening formed laterally through said tank side wall adjacent the top thereof and fluidly communicating with the upper end of said second compartment, an inlet conduit extending into the lower end of said first compartment, and a discharge conduit extending from the upper end of said second compartment.

2. The container of claim 1, further including means forming a passage through the top of said enclosing structure for inserting salt or a brine solution, and a plug member removably secured in said passage.

References Cited in the file of this patent
UNITED STATES PATENTS

| | | |
|---|---|---|
| 2,061,714 | Pick | Nov. 24, 1936 |
| 2,197,193 | Pontis | Apr. 16, 1940 |
| 2,407,228 | Forsyth | Sept. 10, 1946 |
| 2,408,386 | Furry | Oct. 1, 1946 |